US011748730B2

(12) United States Patent
Barkan et al.

(10) Patent No.: US 11,748,730 B2
(45) Date of Patent: Sep. 5, 2023

(54) CAMERA ENHANCED OFF-PLATTER DETECTION SYSTEM

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 288 days.

(21) Appl. No.: 17/185,705

(22) Filed: Feb. 25, 2021

(65) Prior Publication Data

US 2022/0270065 A1    Aug. 25, 2022

(51) Int. Cl.
G06Q 20/20     (2012.01)
G06V 20/00     (2022.01)
G06V 40/20     (2022.01)

(52) U.S. Cl.
CPC .......... G06Q 20/208 (2013.01); G06V 20/00 (2022.01); G06V 40/28 (2022.01)

(58) Field of Classification Search
CPC ...... G06G 20/20; G06G 20/208; G01G 19/40; G01G 19/4144; G01G 19/415;
(Continued)

(56) References Cited

U.S. PATENT DOCUMENTS 8,561,902 B2 * 10/2013 McQueen .......... G01G 19/4144
                                                    235/462.43
9,786,000 B2 * 10/2017 Herring .................. G01B 11/00
(Continued)

FOREIGN PATENT DOCUMENTS

EP      0443419 A2    8/1991
EP      1041378 A1    10/2000
(Continued)

OTHER PUBLICATIONS

Examination Report for Australian Application No. 2022200305 dated Dec. 16, 2022.
(Continued)

*Primary Examiner* — Andrew Joseph Rudy
(74) *Attorney, Agent, or Firm* — Yuri Astvatsaturov

(57) ABSTRACT

An example object recognition and weighing apparatus for use with a POS terminal includes a weigh platter; a scale configured to measure a weight of the item when placed on the weigh platter; an off-platter detection assembly configured to detect an off-platter condition; an object recognition assembly configured to capture image data associated with the item, and based on the image data that includes non-barcode data, identify the item; a communication interface configured to communicate with the POS terminal; a processor in communication with the scale, the off-platter detection assembly, and the communication interface; and a non-transitory machine-readable storage medium storing instructions that, when executed by the processor, cause the object recognition and weighing apparatus to, responsive to detecting the off-platter condition, prevent a transmission of the identified item to the POS terminal until the off-platter condition is no longer detected.

21 Claims, 12 Drawing Sheets

(58) Field of Classification Search
CPC .. G01G 23/3735; G01G 21/22; G01G 21/283; G01G 1/10018; G01G 1/0054; G06K 7/10; G06K 7/10722; G06K 9/00; G06K 9/00624; G06K 9/0035; G06T 7/13
USPC .......................................................... 705/23
See application file for complete search history.

(56) References Cited

U.S. PATENT DOCUMENTS

| | | | |
|---|---|---|---|
| 10,192,208 B1 * | 1/2019 | Catoe | G07G 1/0054 |
| 10,909,342 B1 * | 2/2021 | Barkan | G06K 7/10722 |
| 10,921,177 B1 * | 2/2021 | Barkan | G01G 21/283 |
| 2011/0132985 A1 | 6/2011 | McQueen et al. | |
| 2011/0232972 A1 | 9/2011 | McQueen et al. | |
| 2012/0105205 A1 * | 5/2012 | Claessen | G07G 1/0018 |
| | | | 235/462.13 |
| 2013/0056286 A1 | 3/2013 | Watabe et al. | |
| 2016/0180315 A1 | 6/2016 | Kanamori | |

FOREIGN PATENT DOCUMENTS

| | | |
|---|---|---|
| EP | 3396610 A1 | 10/2018 |
| EP | 2373960 B1 | 2/2019 |
| EP | 3696518 A1 | 8/2020 |
| WO | 2008034494 A1 | 3/2008 |

OTHER PUBLICATIONS

Examination Report for Dutch Application No. 2031066 dated Nov. 23, 2022.

* cited by examiner

CAMERA ENHANCED OFF-PLATTER DETECTION SYSTEM

BACKGROUND

One of the functions of a checkout workstation with a weighing platter is to weigh produce or other products that are priced by weight in order to assist in determining the price of the produce or product. However, produce and products are varied in shape and size and there can be issues where part of the produce or product sits off of the weigh platter, resulting in incorrect weight measurement and, therefore, incorrect pricing. Therefore, there is a need to be able to identify when produce or products being weighed on a weighing platter of a checkout workstation extend off of the weigh platter during the weighing process in order to reduce or eliminate instances of incorrect weight measurement and allow the user to identify and correct the problem before a price for the produce or products is calculated so that weight-based pricing will be accurate.

SUMMARY

In an embodiment, the present invention is an object recognition and weighing apparatus for use with a point of sale (POS) terminal that is operable to execute a transaction associated with a purchase of an item, the object recognition and weighing apparatus comprising: a weigh platter having a first surface extending in a first transverse plane; a scale configured to measure a weight of the item when placed on the surface; an off-platter detection assembly configured to detect an off-platter condition and a no-off-platter condition; an object recognition assembly configured to capture image data associated with the item when placed on the surface and, based on the image data that includes non-barcode data, identify the item as an identified item set, the identified item set including one or more items selected from a preexisting item database where the one or more items are selected based satisfying a predetermined similarity threshold relative to the item; a communication interface configured to communicate with the POS terminal; a processor in communication with the scale, the off-platter detection assembly, and the communication interface; and a non-transitory machine-readable storage medium storing instructions that, when executed by the processor, cause the object recognition and weighing apparatus to: responsive to detecting the off-platter condition, prevent a transmission of the identified item set to the POS terminal; and responsive to detecting the no-off-platter condition, enable the transmission of the identified item set to the POS terminal, wherein the off-platter detection assembly is configured to detect the off-platter condition based on at least one of (i) a portion of the item resting on a second surface off the weigh platter resulting or (ii) at least some portion of the item extending beyond a perimeter of the weigh platter, and wherein the off-platter detection assembly is further configured to detect the no-off-platter condition based on at least one of (i) no portion of the item resting on the second surface off the weigh platter or (ii) no portion of the item extending beyond the perimeter of the weigh platter.

In a variation of this embodiment, detecting a no-off-platter condition is a default mode of operation of the off-platter detection assembly.

In another embodiment, the present invention is an object recognition and weighing apparatus for use with a point of sale (POS) terminal that is operable to execute a transaction associated with a purchase of an item, the object recognition and weighing apparatus comprising: a weigh platter having a first surface extending in a first transverse plane; a scale configured to measure a weight of the item when placed on the surface; an object classification identification system configured to determine if the item is a high-priority item or a non-high-priority item; an off-platter detection assembly configured to detect an off-platter condition and a no-off-platter condition; an object recognition assembly configured to capture image data associated with the item when placed on the surface and, based on the image data that includes non-barcode data, identify the item as an identified item set, the identified item set including one or more items selected from a preexisting item database where the one or more items are selected based satisfying a predetermined similarity threshold relative to the item; a communication interface configured to communicate with the POS terminal; a processor in communication with the scale, the off-platter detection assembly, and the communication interface; and a non-transitory machine-readable storage medium storing instructions that, when executed by the processor, cause the object recognition and weighing apparatus to: responsive to detecting the item being the high-priority item, (i) prevent a transmission of the identified item set to the POS terminal when the off-platter condition is detected and (ii) enable the transmission of the identified item set to the POS terminal when the no-off-platter condition is detected; responsive to detecting the item being the non-high-priority item, enable the transmission of the identified item set to the POS without regard for whether the off-platter condition or the no-off-platter condition is present, wherein the off-platter detection assembly is configured to detect the off-platter condition based on at least one of (i) a portion of the item resting on a second surface off the weigh platter resulting or (ii) at least some portion of the item extending beyond a perimeter of the weigh platter, and wherein the off-platter detection assembly is further configured to detect the no-off-platter condition based on at least one of (i) no portion of the item resting on the second surface off the weigh platter or (ii) no portion of the item extending beyond the perimeter of the weigh platter.

In a variation of this embodiment, detecting a no-off-platter condition is a default mode of operation of the off-platter detection assembly.

In yet another embodiment, the present invention is an object recognition and weighing apparatus for use with a point of sale (POS) terminal that is operable to execute a transaction associated with a purchase of an item, the object recognition and weighing apparatus comprising: a weigh platter having a first surface extending in a first transverse plane; a scale configured to measure a weight of the item when placed on the surface; an off-platter detection assembly configured to detect an off-platter condition; an object recognition assembly configured to capture image data associated with the item when placed on the surface and, based on the image data that includes non-barcode data, identify the item as an identified item set, the identified item set including one or more items selected from a preexisting item database where the one or more items are selected based satisfying a predetermined similarity threshold relative to the item; a communication interface configured to communicate with the POS terminal; a processor in communication with the scale, the off-platter detection assembly, and the communication interface; and a non-transitory machine-readable storage medium storing instructions that, when executed by the processor, cause the object recognition and weighing apparatus to, responsive to detecting the off-platter condition, prevent a transmission of the identified item set to the POS terminal until the off-platter condition is no longer detected, wherein the off-platter detection assembly is configured to detect the off-platter condition based on at least one of (i) a portion of the item resting on a second surface off the weigh platter resulting or (ii) at least some portion of the item extending beyond a perimeter of the weigh platter.

In still yet another embodiment, the present invention is an object recognition and weighing apparatus for use with a point of sale (POS) terminal that is operable to execute a transaction associated with a purchase of an item, the object recognition and weighing apparatus comprising: a weigh platter having a first surface extending in a first transverse plane; a scale configured to measure a weight of the item when placed on the surface; an object classification identification system configured to detect the item as a high-priority item; an off-platter detection assembly configured to detect an off-platter condition; an object recognition assembly configured to capture image data associated with the item when placed on the surface and, based on the image data that includes non-barcode data, identify the item as an identified item set, the identified item set including one or more items selected from a preexisting item database where the one or more items are selected based satisfying a predetermined similarity threshold relative to the item; a communication interface configured to communicate with the POS terminal; a processor in communication with the scale, the off-platter detection assembly, and the communication interface; and a non-transitory machine-readable storage medium storing instructions that, when executed by the processor, cause the object recognition and weighing apparatus to: responsive to (i) detecting the item being the high-priority item and (ii) detecting the off-platter condition, prevent a transmission of the identified item set to the POS terminal until the off-platter condition is no longer detected, wherein the off-platter detection assembly is configured to detect the off-platter condition based on at least one of (i) a portion of the item resting on a second surface off the weigh platter resulting or (ii) at least some portion of the item extending beyond a perimeter of the weigh platter.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
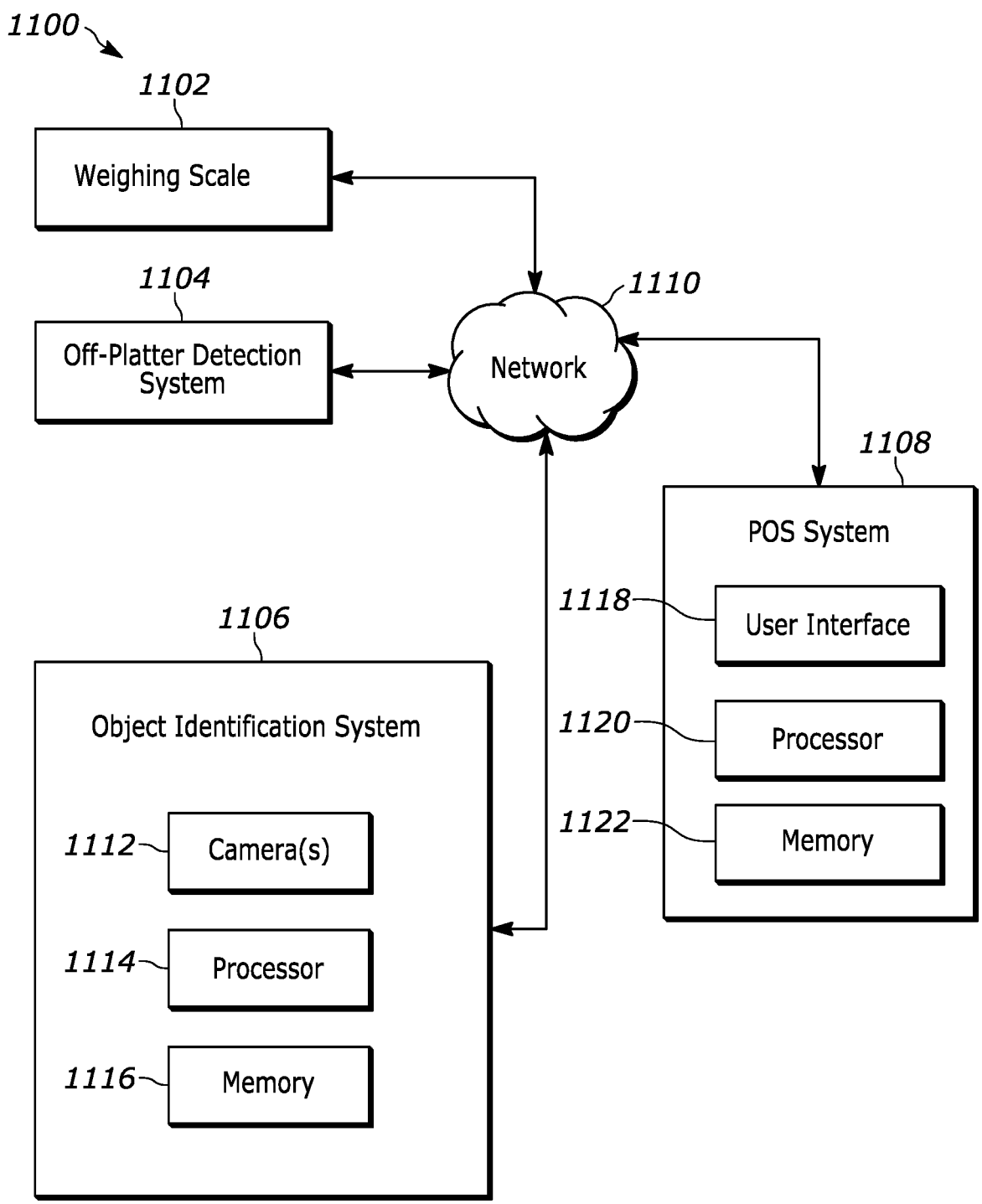
FIG. 1 illustrates a block diagram of an example system including a logic circuit for implementing the example methods and/or operations described herein, including methods for improving the effectiveness of off-platter detection systems based on input from object recognition systems.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure generally relates to checkout workstations having off-platter detection systems that can be used to detect instances of off-platter conditions, in which at least a portion of an item to be purchased is not resting on the weighing platter of the checkout workstation. With the increasing trend for vision cameras to be installed in or around bioptic checkout workstations for object recognition purposes, it is possible to improve the effectiveness of off-platter detection systems based on input from object recognition systems. For instance, in one example, the present disclosure provides a system and method in which the behavior of an object recognition system is modified based on signals from the off-platter detection system, such that the object recognition system is activated in response to determining that any instance of off-platter conditions are resolved, and an indication of the identified object is then sent to the POS system. In another example, the present disclosure provides a system and method in which the object recognition system proceeds normally in a default mode (i.e., the default mode is that there are no off-platter conditions) unless an instance of an off-platter condition is detected, in which the indication of the identified object is prevented from being sent to the POS system. In another example, the present disclosure provides a system and method in which the behavior of the off-platter detection system is modified based on signals from the object recognition system, such that the off-platter detection system is activated in response to a priority level of an item to be purchased identified by the object recognition system, and an indication of the identified object is sent to the POS once any off-platter conditions are resolved. For instance, in some examples, the off-platter detection system may only be activated for high-price items, controlled items (such as alcohol, cigarettes, medications, etc.), or items that are otherwise frequently stolen.

In any case, any off-platter conditions detected by the off-platter detection system must be resolved before an indication of the identified object is sent to the POS system, i.e., such that the price of an item that is priced by weight cannot be calculated until off-platter conditions are resolved. That is, while the current weight measured by the weighing scale is monitored at all times, it is not possible to determine the price of a given object without both a weight of the item and an identification of the item.

In some examples, resolving off-platter conditions may include using an off-platter indication system that provides a user with an alert that there may be an off-platter event, and/or provides the user with an indication of the location of the off-platter event, which allows the user to quickly and easily identify and correct the potential off-platter event. The off-platter indication systems herein can be used with various types of off-platter detection systems, such as infrared (IR) systems, light detection and ranging (LIDAR) systems, camera based systems, beam breaking systems, light only systems, etc., to indicate to the user whether the potential off-platter event is on a left side, right side, or end of the weigh platter and where along the indicated side the off-platter event is occurring.

FIG. 1 illustrates a block diagram of an example checkout workstation system 1100 including a logic circuit for implementing the example methods and/or operations described herein, including methods for improving the effectiveness of off-platter detection systems based on input from object recognition systems. The system 1100 may include a weighing scale 1102, an off-platter detection system 1104, an object recognition system 1106, and a POS system 1108. The weighing scale 1102, off-platter detection system 1104, object recognition system 1106, and POS system 1108 may each communicate with one another via a wired or wireless network 1110.

The weighing scale 1102 (e.g., such as the weigh platter assembly 100 discussed in greater detail below) may monitor the weight of items placed on a weighing platter associated with the checkout workstation and may continuously or periodically log and send the monitored weights to the POS system 1108, e.g., via the network 1110.

The off-platter detection system 1104 (also called an off-platter detection assembly, as discussed in greater detail with respect to FIGS. 2-11) is generally configured to detect instances of off-platter conditions in which at least a portion of an item to be purchased is not resting on the weighing platter. In some examples, the off-platter detection system 1104 may display alerts or notifications to users when instances of off-platter conditions are detected, or may send indications of instances of off-platter conditions to the POS system, e.g., via the network 1110, to be displayed to the user. In some examples, the off-platter detection system 1104 may send indications of such instances to the object recognition system 1106, e.g., via the network 1110. Additionally, in some examples, the off-platter detection system 1104 may receive indications of priority levels associated with items to be purchased on or around the weighing platter as identified by the object recognition system 1106. For instance, in some examples, the off-platter detection system 1104 may be activated to monitor for instances of off-platter conditions only when a priority level associated with an item to be purchased is above a threshold priority level, and may not monitor for instances of off-platter conditions when the priority level associated with the item to be purchased is below the threshold priority level.

The object recognition system 1106 may be configured to capture images of items to be purchased that are placed on the weighing platter associated with the checkout workstation using one or more cameras 1112. In some examples, one or more of the cameras 1112 may be further configured to capture images of users of the checkout workstation 1100. The object recognition system 1106 may further include one or more processors 1114 and a memory 1116 (e.g., volatile memory, non-volatile memory) accessible by the one or more processors 1114 (e.g., via a memory controller). The one or more processors 1114 may interact with the memory 1116 to obtain, for example, computer-readable instructions stored in the memory 1116. The computer-readable instructions stored in the memory 1116, when executed by the one or more processors 1114, may cause the one or more processors 1114 to analyze the captured images in order to identify each item to be purchased and send indications of identified items to the POS system 1108, e.g., via the network 1110. In some examples, identifying each item may mean determining several possible identifications for each item, and sending indications of the possible identifications for each item to the POS system 1108, so that a user of the POS system 1108 can select which possible identification is correct. In some examples, the computer-readable instructions stored on the memory 1116 may include instructions for identifying priority levels associated with each item to be purchased, and sending indications of identified priority levels associated with each item to be purchased to the off-platter detection system 1104, e.g., via the network 1110. For instance, the priority level of an item may be based on one or more of: a total price associated with the item, a price per unit weight associated with the item, whether the item is a controlled item (e.g., alcohol, cigarettes, certain medications, etc.), and/or a high theft potential associated with the item. For example, determining that a high theft potential is associated with an item may be based on frequent observations of ticket switching associated with the item and/or frequent observations of scan avoidance associated with the item. When there are multiple possible identifications of a given item, the priority level sent to the off-platter detection system 1104 may be the highest of the possible priority levels associated with each possible identification of the item.

Moreover, in some examples, the computer-readable instructions stored on the memory 1116 may include instructions for receiving indications of instances of off-platter conditions detected by the off-platter detection system 1104, and only capturing images, analyzing captured images to identify items to be purchased, and sending indications of identified items to the POS system 1108 when no off-platter conditions are detected by the off-platter detection system 1104 or once any off-platter conditions detected by the off-platter detection system 1104 are resolved.

Additionally, the computer-readable instructions stored on the memory 1116 may include instructions for carrying out any of the steps of the method 1200, described in greater detail below with respect to FIG. 12, or the steps of method 1300, described in greater detail below with respect to FIG. 13.

The POS system 1108 may be configured to calculate prices of items to be purchased by users, based on receiving an identification of the item as determined by the object recognition system 1106 and based on the weight measured by the weighing scale 1102 at the time that the POS system 1108 receives the identification of the item. The POS system 1108 may include a user interface 1118 configured to receive input from users and provide information to users. The POS system 1108 may further include one or more processors 1120 and a memory 1122 (e.g., volatile memory, non-volatile memory) accessible by the one or more processors 1120 (e.g., via a memory controller). The one or more processors 1120 may interact with the memory 1122 to obtain, for example, computer-readable instructions stored in the memory 1122. The computer-readable instructions stored in the memory 1122, when executed by the one or more processors 1120, may cause the one or more processors 1120 to monitor the current weight measured by the weighing scale 1102, e.g., based on data sent from the weighing scale 1102 to the POS system 1108 via the network 1110. Furthermore, the computer-readable instructions stored on the memory 1122 may further include instructions for receiving indications of one or more possible identifications of items to be purchased from the object recognition system 1106, e.g., via the network 1110, and calculating a weight-based price for each item to be purchased based on the identification of the item and the weight measured by the weighing scale 1102 at the time when the POS system 1108 receives the indication of the identification of the item. That is, the computer-readable instructions stored on the memory 1122 may cause the POS system 1108 to access a database listing prices per unit weight for the identified item, and may calculate the price of the item based on the price per weight and the weight at the time when the indication of the identification of item is received. When the POS system 1108 receives multiple possible identifications for the item, the POS system 1108 may display the possible identifications to a user via the user interface 1118, such that a user may select which of the possible identifications is correct, and may calculate the price for the item once the user selects a possible identification.

Additionally, in some examples, the computer-readable instructions stored on the memory 1122 may further include instructions for receiving indications of instances of off-platter conditions from the off-platter detection system 1104, e.g., via the network 1110, and displaying notifications to the user indicating that there is an off-platter condition, indicating possible ways that the user can correct the off-platter condition, etc.

Furthermore, the computer-readable instructions stored on the memory 1122 may include instructions for carrying out any of the steps of the method 1200, described in greater detail below with respect to FIG. 12, or the steps of method 1300, described in greater detail below with respect to FIG. 13.

Figure 2:
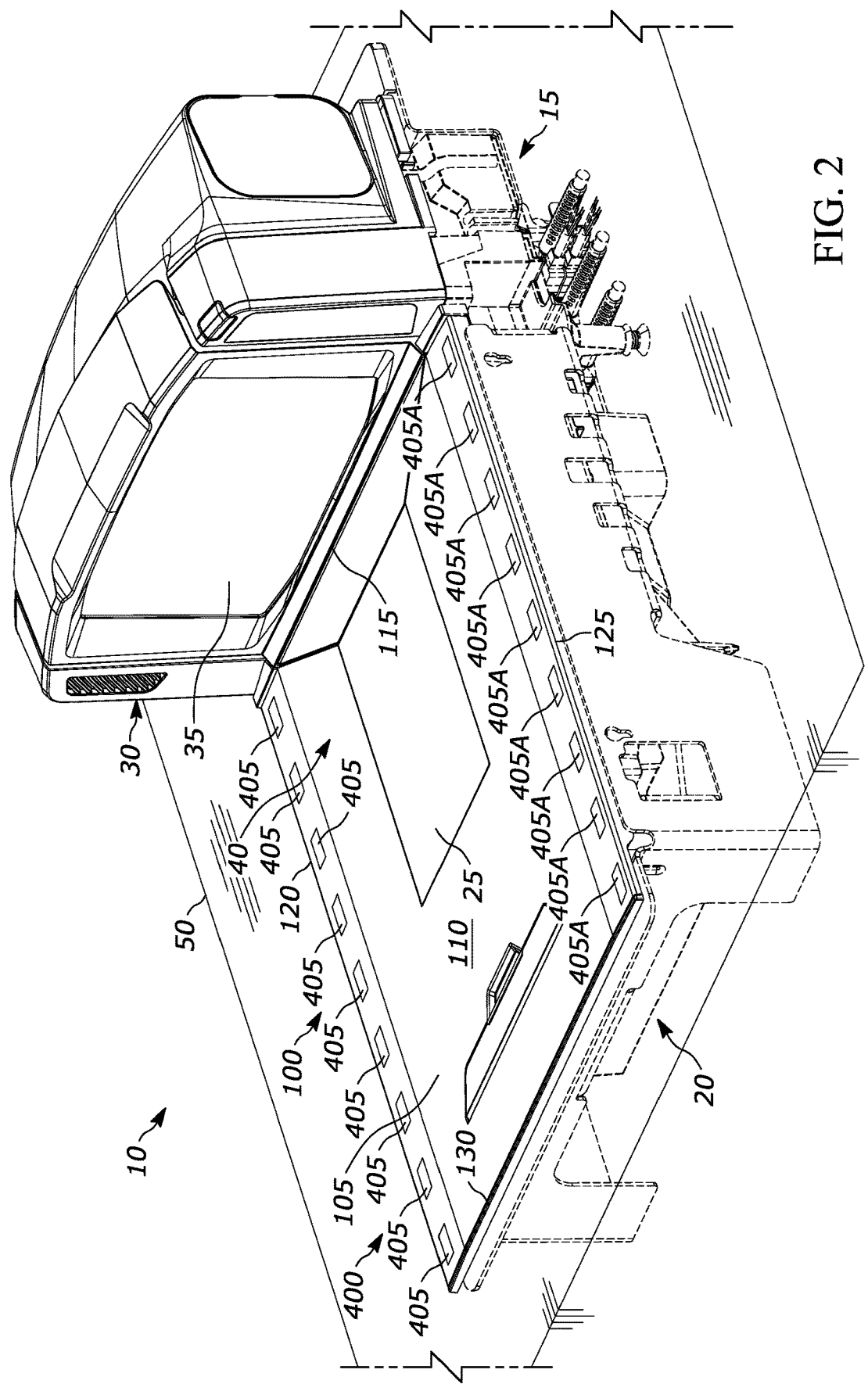
FIG. 2 illustrates a front perspective view of a first example checkout workstation having an off-platter detection assembly with a first example off-platter indication system.
Figure 3:
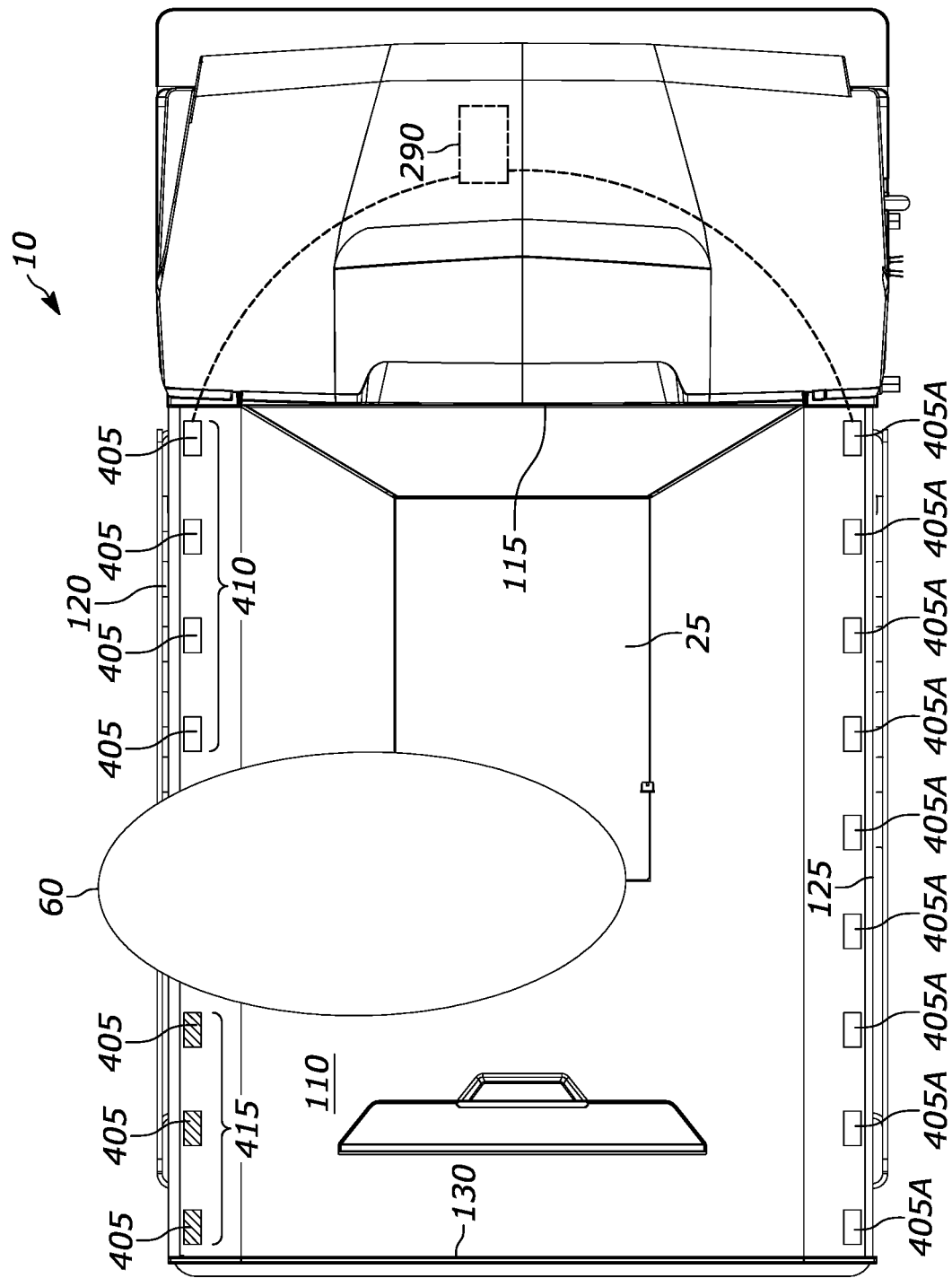
FIG. 3 illustrates a top view of the checkout workstation of FIG. 2 with an object extending across a first lateral edge of the weigh platter.

Referring to FIGS. 2-3, a first example checkout workstation 10, such as the Zebra® MP7000 bioptic barcode reader, is shown and can be configured to be supported by a checkout counter 50 at a POS of a retail store. Checkout workstation 10 has a housing 15 that includes a lower housing 20 that houses a weigh platter assembly 100 and an upper housing 30 that extends above lower housing 20. Upper housing 30 includes a generally vertical window 35 to allow a first set of optical components positioned within housing 15 to direct a first field-of-view through vertical window 35. In addition, if the checkout workstation 10 is a bioptic barcode reader, lower housing 20 will include a generally horizontal window 25, which in the example shown is positioned in a weigh platter 105 of weigh platter assembly 100 to allow a second set of optical components positioned within housing 15 to direct a second field of view through horizontal window 25. The first and second fields of view intersect to define a product scanning region 40 of checkout workstation 10 where a product can be scanned for sale at the POS.

Weigh platter assembly 100 generally includes a weigh platter 105 that is positioned within lower housing 20 and is configured to measure the weight of an object placed on weigh platter 105. Weigh platter 105 has upper surface 110 that faces product scanning region 40, a proximal edge 115, a first lateral edge 120, a second lateral edge 125, and a distal edge 130. In the example shown, proximal edge 115 is adjacent upper housing 30 and would be the edge furthest from a user of weigh platter assembly 100 and/or checkout workstation 10. First lateral edge 120 extends non-parallel to proximal edge 115. Second lateral edge 125 is opposite first lateral edge 120 and extends non-parallel to proximal edge 115. Distal edge 130 is opposite proximal edge 115, would be the edge closest to the user, and extends non-parallel to first and second lateral edges 120, 125. In the example shown, weigh platter is generally rectangular and first and second lateral edges 120, 125 are parallel and perpendicular to proximal edge 115 and distal edge 130 and distal edge is parallel to proximal edge 115.

The checkout workstation 10 in FIGS. 2-3 also includes an off-platter detection assembly with a first example off-platter indication system 200, which has a plurality of linearly aligned light sources 405 that each represent a location along first lateral edge 120 of weigh platter 105. In the example shown, light sources 405 can be any type of light source, such as light emitting diodes, and are positioned in upper surface 110 of weigh platter 105 and generally aligned along first lateral edge 120. In the example shown, light sources 405 are spread out along the entire length of weigh platter 105, however, light sources 405 can also be grouped closely together and positioned adjacent distal edge 130 of weigh platter 105 so that light sources 405 are easily viewable by a user and the chance that an object being weighed would obscure light sources 405 from the view of the user would be reduced. For simplicity, only light sources 405 along first lateral edge 120 are described herein, however, it will be understood that off-platter indication system 400 can also include a second plurality of linearly aligned light sources 405A along second lateral edge 125 to provide an indication of a potential off-platter event and the location of the potential off-platter event along second lateral edge 125. The off-platter detection assembly also has a controller 290 that is configured to determine if an object 60 (FIG. 3) extends over first lateral edge 120 of weigh platter 105 and, if so, determine the location of object 60 along first lateral edge 120, as described in more detail below. If controller 290 determines that object 60 extends over first lateral edge 120, controller 290, which is operatively coupled to light sources 405, is configured to illuminate a first portion 410 of light sources 405 located between object 60 and proximal edge 115 of weigh platter 105 to represent the distance between proximal edge 115 and the location that object 60 crosses first lateral edge 120 and to de-illuminate a second portion 415 of light sources 405 located between object 60 and distal edge 130 of weigh platter 105 to represent the distance between the location that object 60 crosses first lateral edge 120 and distal edge 130. The de-illumination of second portion 415 of light sources 405 alerts the user that there is a potential off-platter event along first lateral edge 120 and the illumination of the first portion 410 of light sources 405 identifies to the user the location of the potential off platter event. In addition, off-platter indication system can have a speaker or other audio device that can also provide audio notifications informing the user where the potential off-platter event is occurring (e.g., left side, right side, left side near upper housing, right side near end of platter, etc.).

Figure 4:
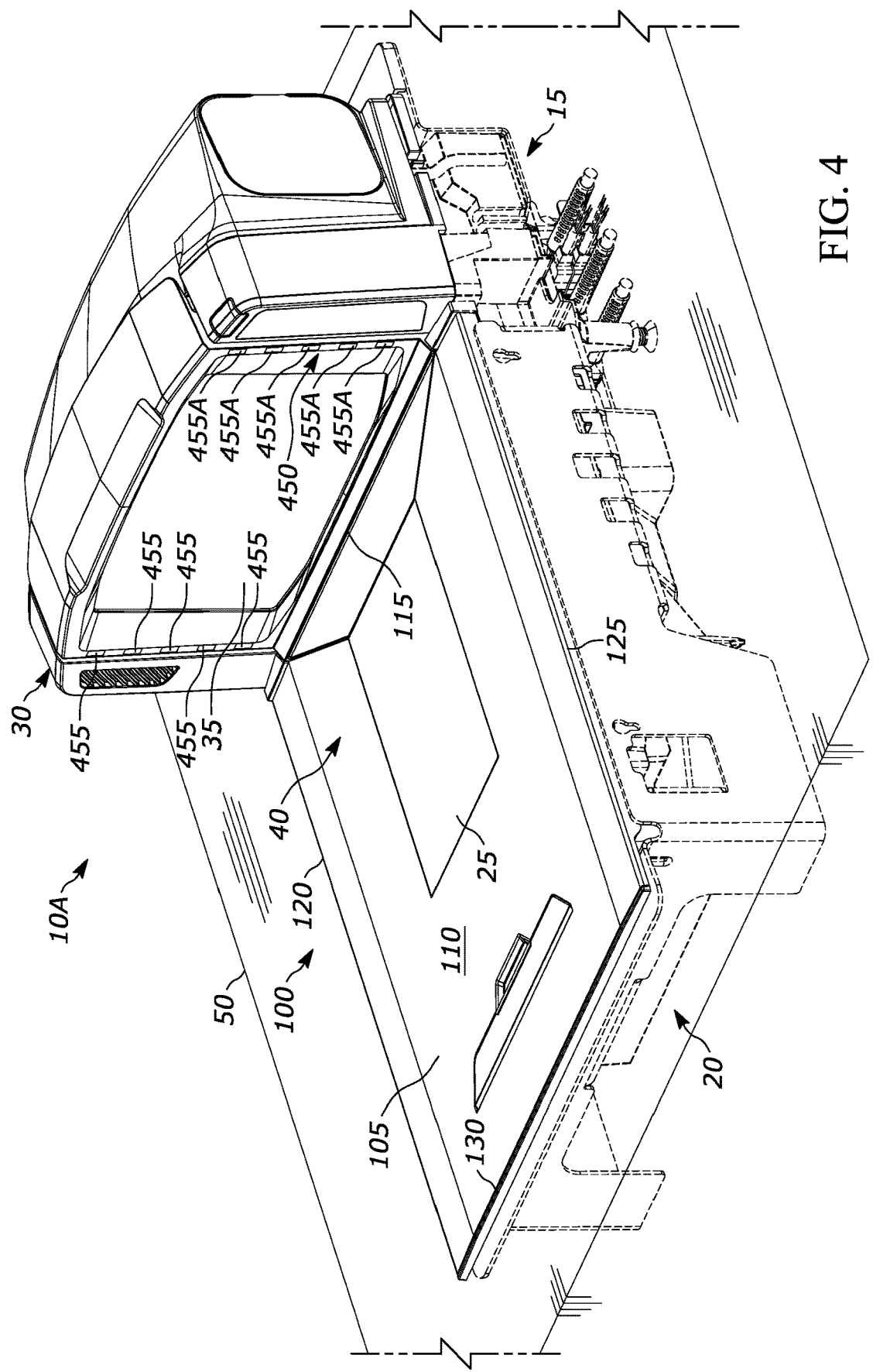
FIG. 4 illustrates a front perspective view of a second example checkout workstation having an off-platter detection assembly with a second example off-platter indication system.
Figure 5:
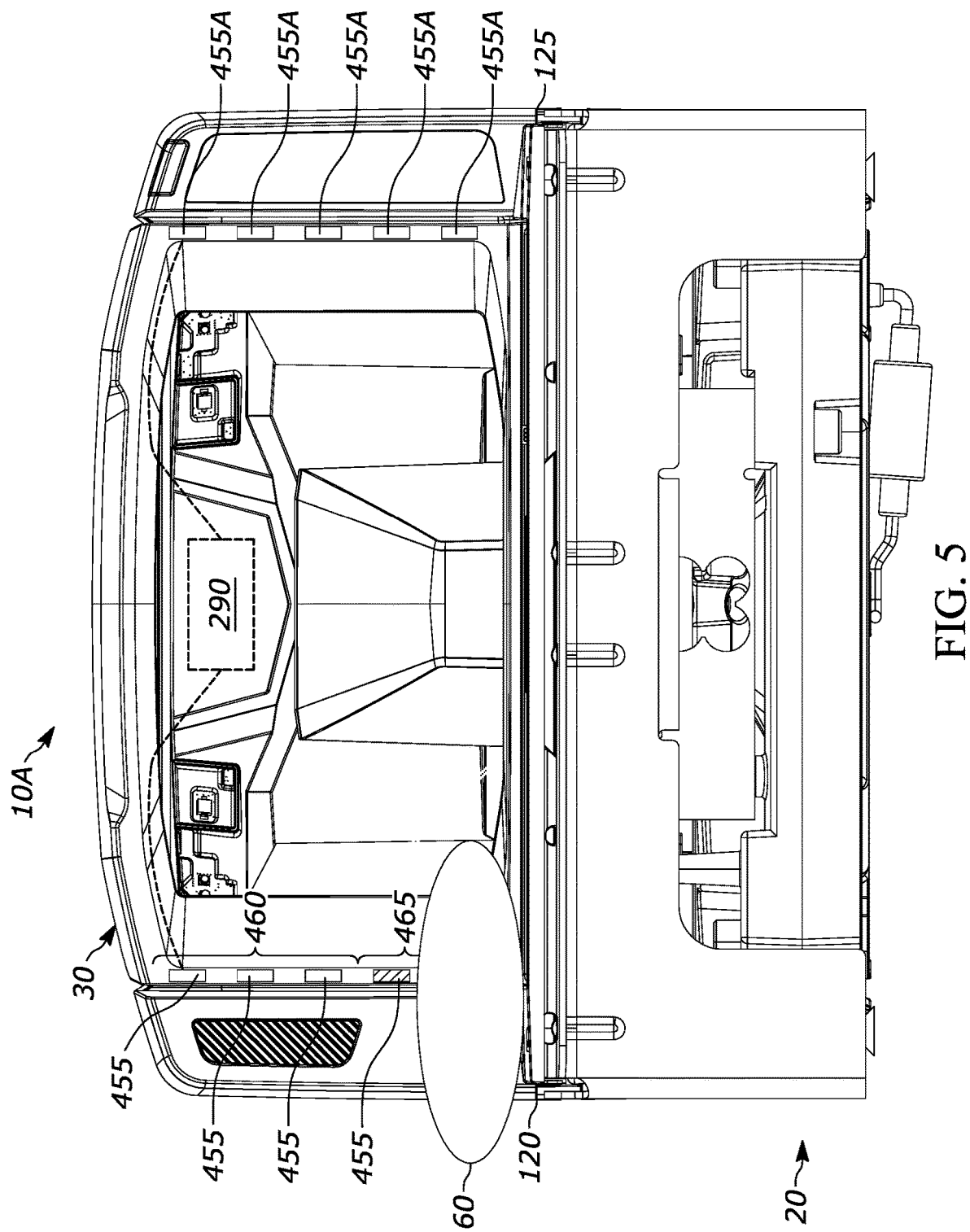
FIG. 5 illustrates a front view of the checkout workstation of FIG. 4 with an object extending across a first lateral edge of the weigh platter.

Referring to FIGS. 4-5, a second example checkout workstation 10A is illustrated that is the same as checkout workstation 10, but includes an off-platter detection assembly with a second example off-platter indication system 450, rather than off-platter indication system 400. Off-platter indication system 450 is similar to off-platter indication system 400 in that off-platter indication system 450 has a plurality of linearly aligned light sources 455 that each represent a location along first lateral edge 120 of weigh platter 105. In the example shown, light sources 405 can be any type of light source, such as light emitting diodes, and are positioned in upper housing 30 and are generally aligned with first lateral edge 120 of weigh platter 105 and directed towards distal edge 130 so they are visible by a user. In the example shown, light sources 455 are spread out along the entire height of upper housing 30, however, light sources 455 can also be grouped closely together and positioned adjacent the top of upper housing 30 so that light sources 455 are easily viewable by a user and the chance that a tall object being weighed would obscure light sources 455 from the view of the user would be reduced. Again, for simplicity, only light sources 455 aligned with first lateral edge 120 are described herein, however, it will be understood that off-platter indication system 450 can also include a second set of light sources 455A aligned with second lateral edge 125 to provide an indication of a potential off-platter event and the location of the potential off-platter event along second lateral edge 125. The off-platter detection assembly also has a controller 350 that is configured to determine if an object 60 (FIG. 5) extends over first lateral edge 120 of weigh platter 105 and, if so, determine the location of object 60 along first lateral edge 120, as described in more detail below. If controller 350 determines that object 60 extends over first lateral edge 120, controller 350, which is operatively coupled to light sources 455, is configured to illuminate a first portion 460 of light sources 455 to represent the distance between proximal edge 115 and the location that object 60 crosses first lateral edge 120 and to de-illuminate a second portion 465 of light sources 455 to represent the distance between the location that object 60 crosses first lateral edge 120 and distal edge 130. The de-illumination of second portion 465 of light sources 455 alerts the user that there is a potential off-platter event along first lateral edge 120 and the illumination of the first portion 460 of light sources 455 identifies to the user the location of the potential off platter event.

Figure 6:
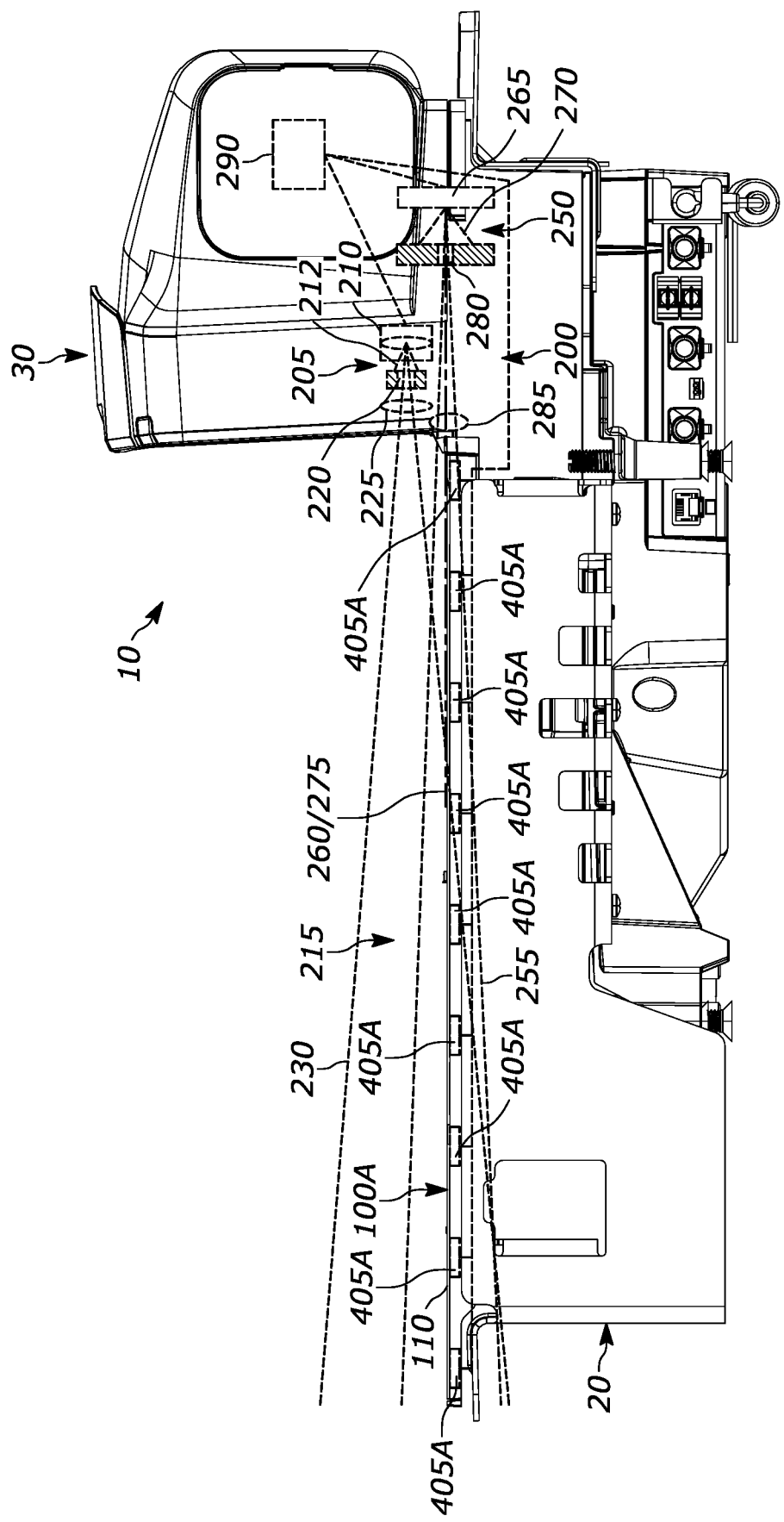
FIG. 6 illustrates a side view of the checkout workstation of FIG. 2 with one example off-platter detection assembly.
Figure 7:
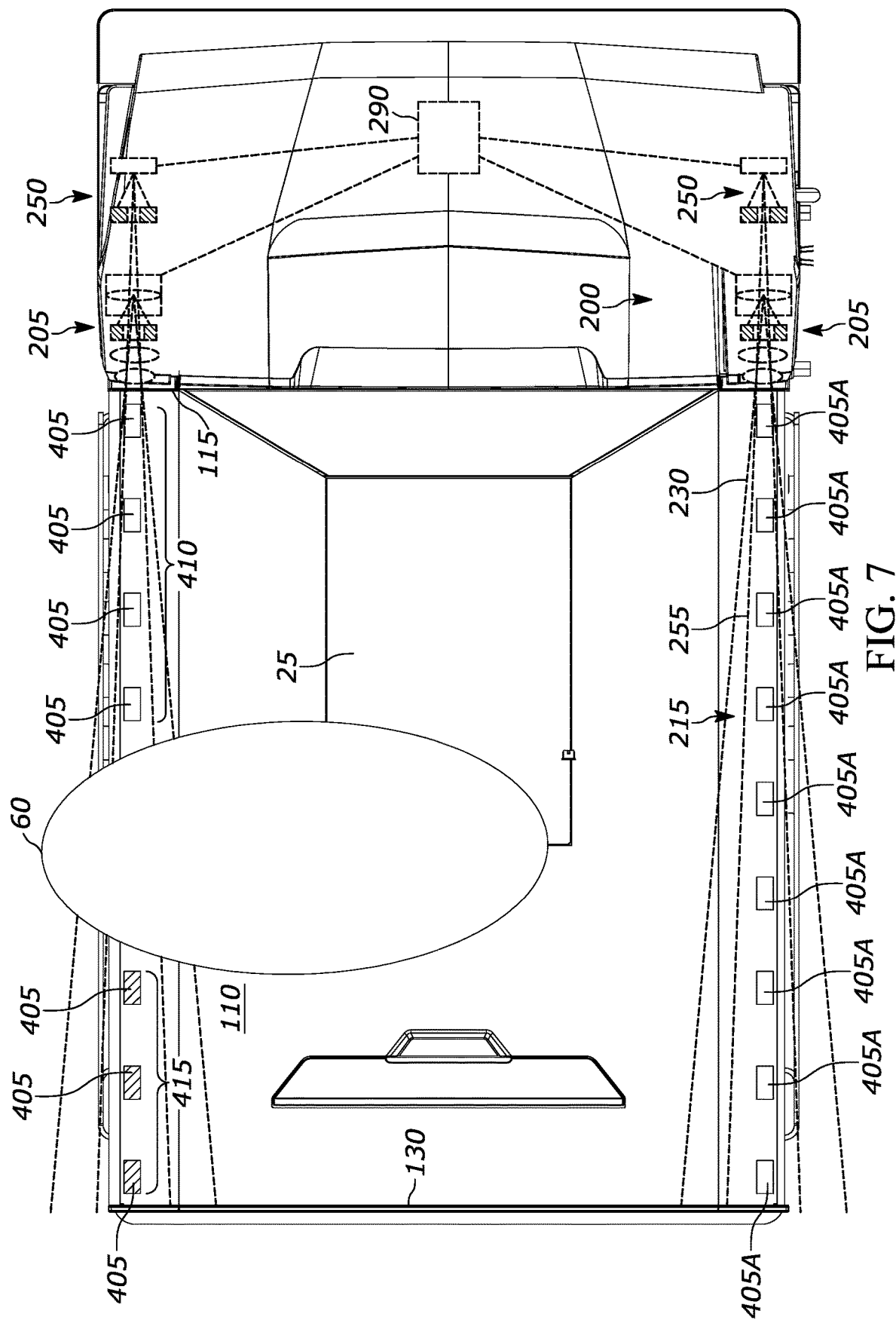
FIG. 7 illustrates a top view of the checkout workstation of FIG. 6 with an object extending across a first lateral edge of the weigh platter.

FIGS. 6-7 illustrate a checkout workstation 10 with an off-platter indication system 400 and one particular example of an off-platter detection assembly 200, which in the example shown is a LIDAR based system. The example off-platter detection assembly 200 generally includes a light emission assembly 205, a light detection assembly 250, and controller 290 operatively coupled to light emission assembly 205 and light detection assembly 250. For simplicity, only a single light emission assembly 205 and light detection assembly 250 along first lateral edge 120 are described herein, however, it will be understood that off-platter detection assembly 200 can also include a second light emission assembly and a second light detection assembly on an opposite side to detect objects that extend over second lateral edge 125, as shown in FIG. 7.

Light emission assembly 205 can be located within upper housing 30 of housing 15, has a light source 210, and is configured to emit pulses of light 215 away from proximal edge 115, towards distal edge 130, and along first lateral edge 120 of weigh platter 105. Light source 210 could be an LED that is focused into a narrow beam, similar to an aiming dot used in scanners, a focused laser beam, etc., and could be on the infrared wavelength, visible light wavelength, or any wavelength desired. Light source 210 can have a field-of-view 212 and light emission assembly 205 can also include an aperture 220, which could be formed in a wall or protrusion of housing 15 or could be formed through another wall or structure that is part of weigh platter assembly 100, positioned in front of light source 210 to constrain field-of-view 212 of light source 210 into a narrow field-of-view 230 along first lateral edge 120. A lens 225 can also be positioned in front of aperture 220 and configured to focus the one or more pluses of light 215. In addition, although off-platter detection assembly 200 does not require any bumps or physical barriers at distal edge 130 of weigh platter 105, if desired, a barrier can be positioned at distal edge 130, opposite light emission assembly 205, and can be made of a material and/or color that is absorptive to the wavelength of the pulses of light 215 to prevent reflection of the pulses of light 215 from objects or users that are beyond distal edge 130.

Light detection assembly 250 can also be located within housing 15 and has a field-of-view 255, with a central field-of-view axis 260 that is substantially adjacent to and parallel relative to first lateral edge 120, that extends from proximal edge 115 to at least distal edge 130 and along first lateral edge 120. Light detection assembly 250 has a light sensor 265 that is configured to detect at least a portion of the pulses of light 215 that are reflected from an object 60 that extends across the path of the pulses of light 215, and therefore off weigh platter 105, towards proximal edge 115 and within field-of-view 255. To restrict field-of-view 255, light sensor 265 can be set deep within housing 15 or the path of field-of-view 255 can be folded with reflectors or prisms to locate light sensor 265 wherever needed inside housing 15. The deep inset of light sensor 265 helps light sensor 265 remain immune to other outside light sources. Light sensor 265 can have a second field-of-view 270 that is larger than field-of-view 255 of light detection assembly 250 and an aperture 280, which could be formed in a wall or protrusion of housing 15 or could be formed through another wall or structure that is part of weigh platter assembly 100, can be positioned in front of light sensor 265 to constrain field-of-view 270 of light sensor 265, where a center of aperture 280 is coaxial with a central field-of-view axis 275 of field-of-view 270 of light sensor 265. In addition, a lens 285 can also be positioned in front of aperture 280 and configured to focus the reflected portion of the pulses of light 215 onto light sensor 265. For example, aperture 280 can be 1 millimeter or smaller and be positioned 3 inches back from lens 285, which will provide a magnification of approximately 400% at distal edge 130 of weigh platter 105.

In addition to controlling the illumination and de-illumination of light sources 405, controller 290 is also configured to measure a time-of-flight of a pulse of light reflected from an object 60 (FIG. 7). The time-of-flight is the time elapsed from when the pulse of light is emitted by light emission assembly 205 to when at least a portion of the pulse of light is reflected back to light detection assembly 250 and detected by light sensor 265. Controller 290 can also be configured to determine if object 60 extends across first lateral edge 120 and off of weigh platter 105 by determining if the time-of-flight of the reflected portion of the pulse of light is equal to or greater than a predetermined time-of-flight, which is the predetermined time elapsed from when a light pulse is emitted by light emission assembly 205 to when at least a portion of the pulse of light is reflected back to light detection assembly 250 from an object that located at distal edge 130 of weigh platter 105 and detected by light sensor 265. If a measured time-of-flight is equal to or greater than the predetermined time-of-flight, or if a pulse of light is not reflected back to light detection assembly 250, this indicates that there is no object extending across first lateral edge 120 between proximal edge 115 and distal edge 130 and controller 290 can be configured to allow the measure weight of the object to be recorded. If the measured time-of-flight is less than the predetermined time-of-flight this indicates that object 60 is extending across first lateral edge 120 between proximal edge 115 and distal edge 130 and, in addition to illuminating and de-illuminating light sources 405 as described above, controller 290 can also be configured to prevent the measured weigh of object 60 from being recorded. Controller 290 can also be configured to determine the location of object 60 along first lateral edge 120 based on the time-of-flight. The shorter the time-of-flight, the closer object 60 is to light sensor 265 and, therefore, to proximal edge 115. The longer the time-of-flight, the further object 60 is from light sensor 265 and, therefore, from proximal edge 115.

In operation, light emission assembly 205 of off-platter detection assembly 200 emits pulses of light 215 from light source 210 along first lateral edge 120 of weigh platter 105. Light detection assembly 250 has field-of-view 255 along first lateral edge 120. When an object 60 extends across the path of the pluses of light 215, and therefore off weigh platter 105, a portion of the pulses of light 215 are reflected from object 60 and towards light sensor 265 and light sensor 265 detects the portion of the pulses of light 215 reflected from object 60. Controller 290 receives a signal from light sensor 265 indicating that reflected light from object 60 has been detected and either a time the reflected light was detected. Depending on the time-of-flight, controller 290 then determines if object 60 extends across first lateral edge 120 and off weigh platter 105 and, if so, the location that object 60 extends across first lateral edge 120, as discussed above.

Figure 8:
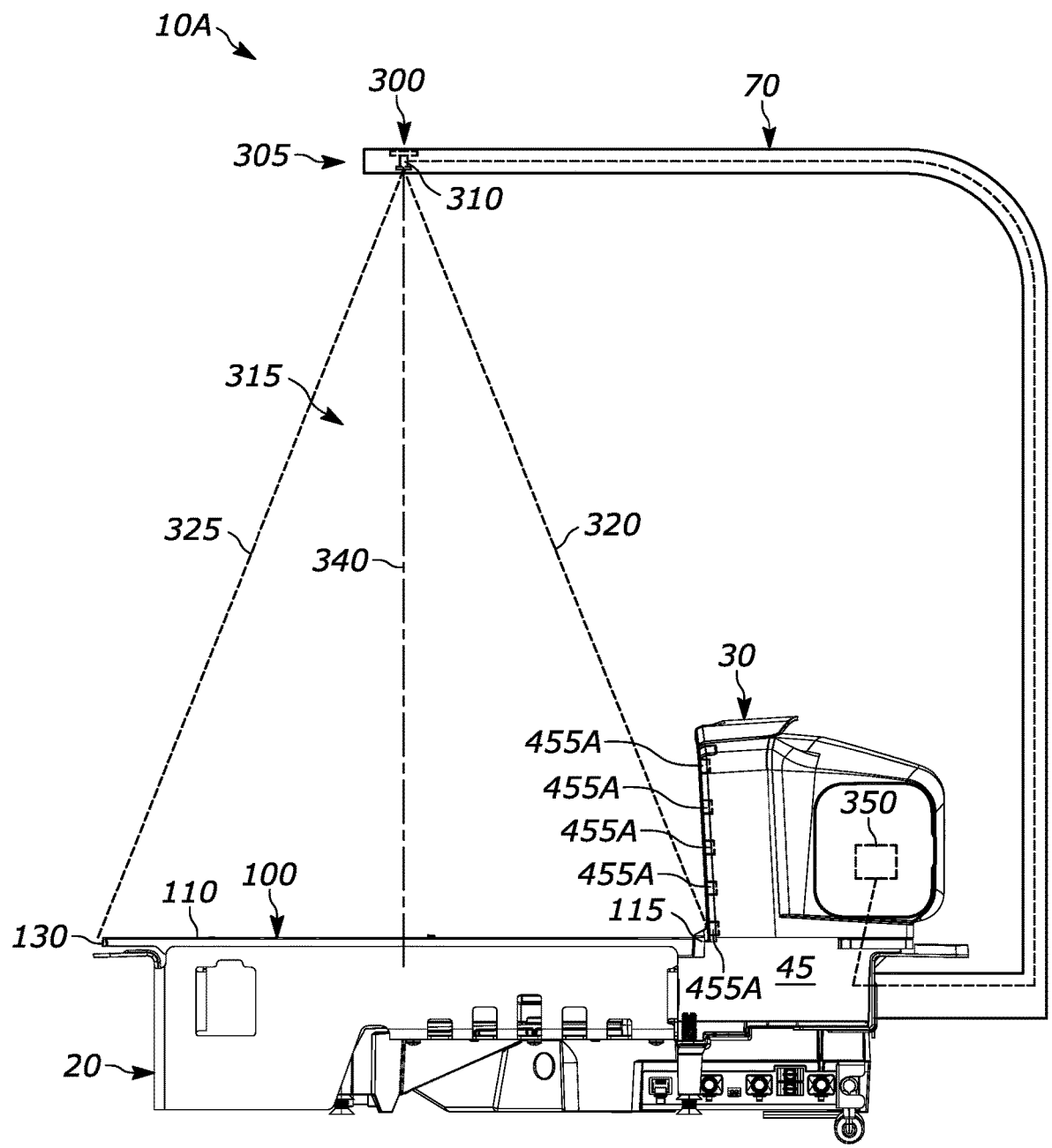
FIG. 8 illustrates a side view of the checkout workstation of FIG. 4 with another example off-platter detection assembly.
Figure 9:
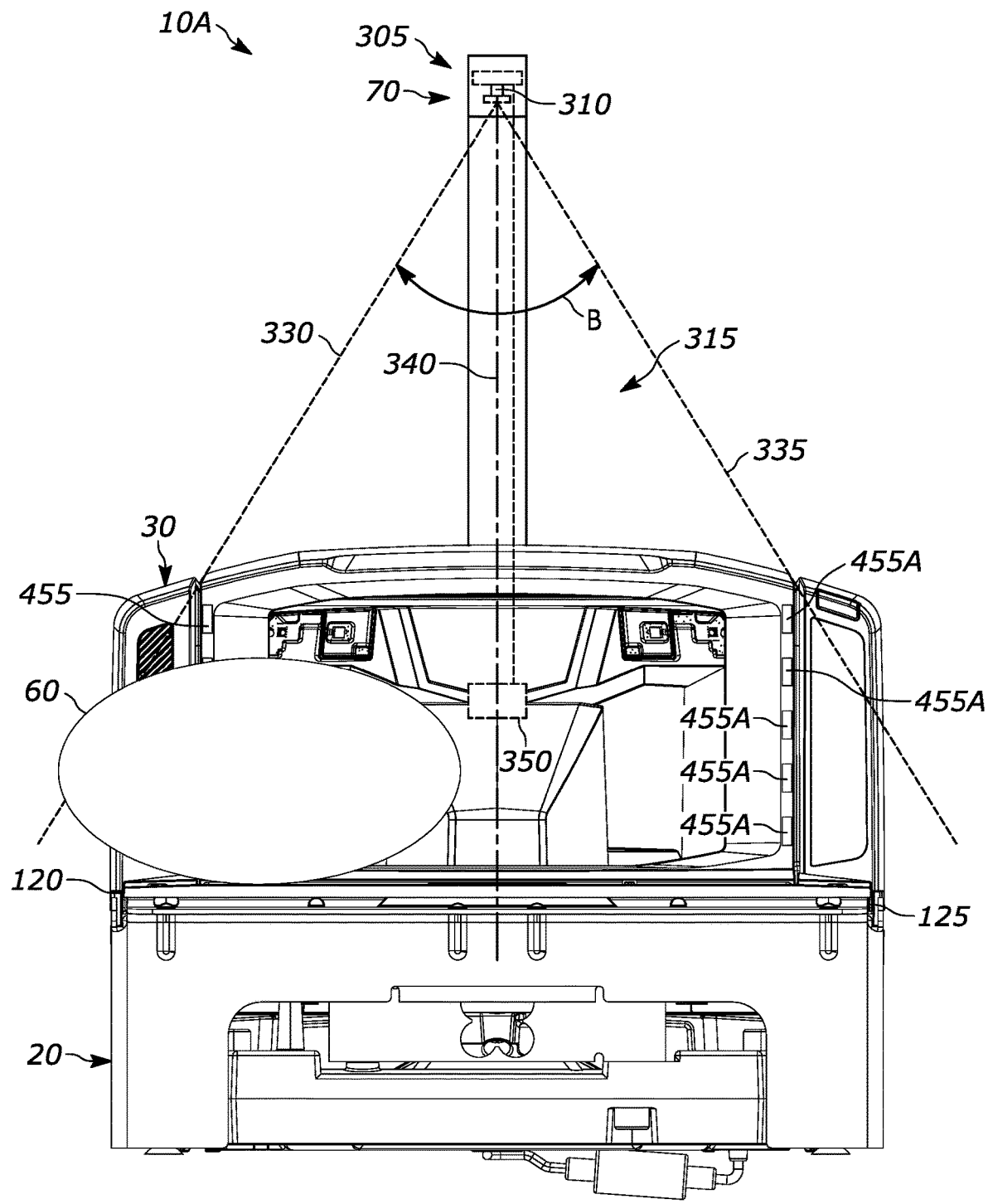
FIG. 9 illustrates a front view of the checkout workstation of FIG. 8 with an object extending across a first lateral edge of the weigh platter.

FIGS. 8-9 illustrate a checkout workstation 10A with an off-platter indication system 450 and one particular example of an off-platter detection assembly 300, which in the example shown is a camera based system. In this example, off-platter detection assembly 300 generally includes an overhead imaging assembly 305 and controller 350 operatively coupled to overhead imaging assembly 305, which is positioned substantially above weigh platter 105 and looks down on weigh platter 105. Positioning overhead imaging assembly 305 above and looking down on weigh platter 105 locates overhead imaging assembly 305 far enough above tall items being weighted so as to reduce the chance that a tall object would falsely trigger off-platter detection assembly 300. Overhead imaging assembly 305 can be an imaging assembly that is dedicated to off-platter detection assembly 300 or an imaging assembly that is already part of the checkout workstation 10 and used for object recognition and is positioned above and looking down on weigh platter 105. Overhead imaging assembly 305 includes an imager 310, preferably a 2 mega pixel camera, that has a field-of-view 315 that extends downward towards upper surface 110 of weigh platter 105 and is configured to capture an image of upper surface 110 of weigh platter 105 with object 60 located on weigh platter 105, including first lateral edge 120 and second lateral edge 125, within field-of-view 315. Field-of-view 315 has a proximal boundary 320, a distal boundary 325, opposite proximal boundary 320, a first lateral boundary 330, and a second lateral boundary 335, opposite first lateral boundary 330. To provide the maximum amount of lateral coverage of upper surface 110, field-of-view 315 preferably has a transverse field-of-view angle B between first lateral boundary 330 and second lateral boundary 335 that is within the range of 100 degrees and 135 degrees.

In the example shown, the checkout workstation 10A includes a gooseneck post 70 that extends from a back of housing 15 and extends over weigh platter 105 and overhead imaging assembly 305 is positioned within gooseneck post 70 such that a central axis 340 of field-of-view 315 extends generally perpendicular to upper surface 110 of weigh platter 105. Alternatively, rather than being positioned within gooseneck post 70, overhead imaging assembly 305 could be mounted or positioned in any position above and looking down on weigh platter 105, such as in a ceiling or as part of an overhead object recognition system or security system overlooking weigh platter 105. To provide the maximum amount of longitudinal coverage of upper surface 110, overhead imaging assembly 305 can be positioned such that proximal boundary 320 of field-of-view 315 intersects upper surface 110 of weigh platter 105 at or substantially adjacent proximal edge 115 (e.g., within the range of 0-30 mm of proximal edge 115) and distal boundary 325 extends to or beyond distal edge 130.

Controller 350 can be calibrated initially (at the factory or during installation or final testing) by being configured to identify and locate first lateral edge 120 and second lateral edge 125 based on a training image of upper surface 110 of weigh platter 105 within field-of-view 315. The training image is an image of upper surface 110 of weigh platter 105 without an object placed on weigh platter 105 and first lateral edge 120 and second lateral edge 125 within field-of-view 315. For example, the location of the first and second lateral edges 120, 125 can be identified by a user observing the training image by drawing or indicating lies on the training image using a configuration tool or the first and second lateral edges 120, 125 could be detected automatically by controller 350.

In addition to controlling the illumination and de-illumination of light sources 455, controller 350 is also configured to receive an image from imager 310 and determine if an object 60 (FIG. 9) positioned on weigh platter 105 extends over first or second lateral edges 120, 125 and, if so, determine the location of object 60 along first lateral or second lateral edge 120, 125 based on the image. Controller 350 can be configured to determine if and where object 60 extends over first or second lateral edges 120, 125 by determining if part of the first or second lateral edges 120, 125 or the gap between weigh platter 105 and lower housing 20 or workstation 50, determined during calibration based on the training image, is blocked or not visible. Controller 350 can also use a convolutional neural network (CNN) to determine whether object 60 extends over first or second lateral edges 120, 125, for example, by identifying object 60 and its orientation and comparing it against a database of dimensional data to determine whether object 60 crosses first or second lateral edges 120, 125. If controller 350 determines that object 60 does not extend over either first or second lateral edges 120, 125, controller 350 can be configured to allow the measured weight of object 60 to be recorded. If controller 350 determines that object 60 does extend over first lateral edge 120 and/or second lateral edge 125, in addition to the illumination and de-illumination of light sources 455 as described above, controller 350 can be configured to prevent the measured weight of object 60 from being recorded.

Figure 10:
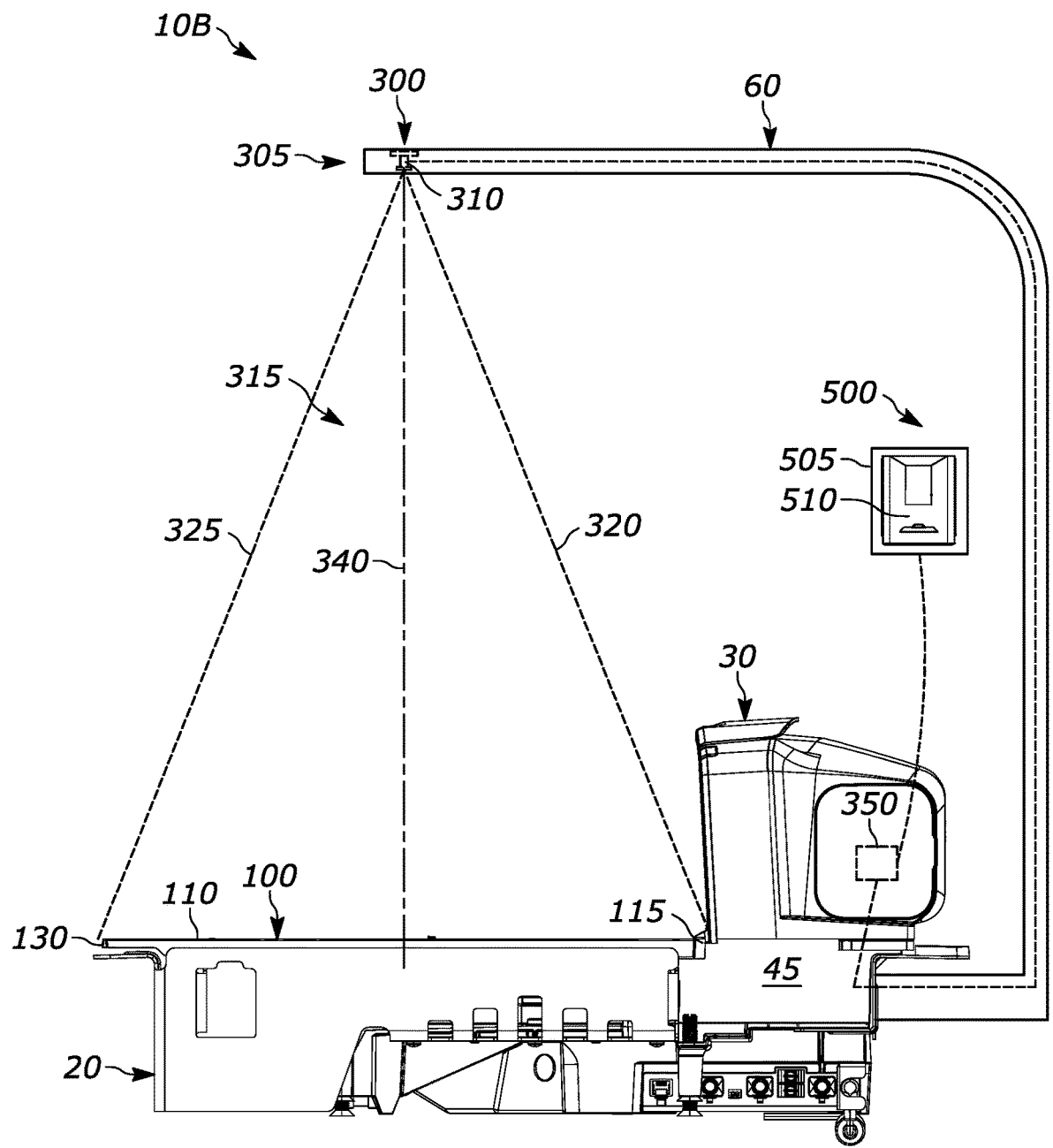
FIG. 10 illustrates a side view of a third example checkout workstation having an off-platter detection assembly with a third example off-platter indication system.
Figure 11:
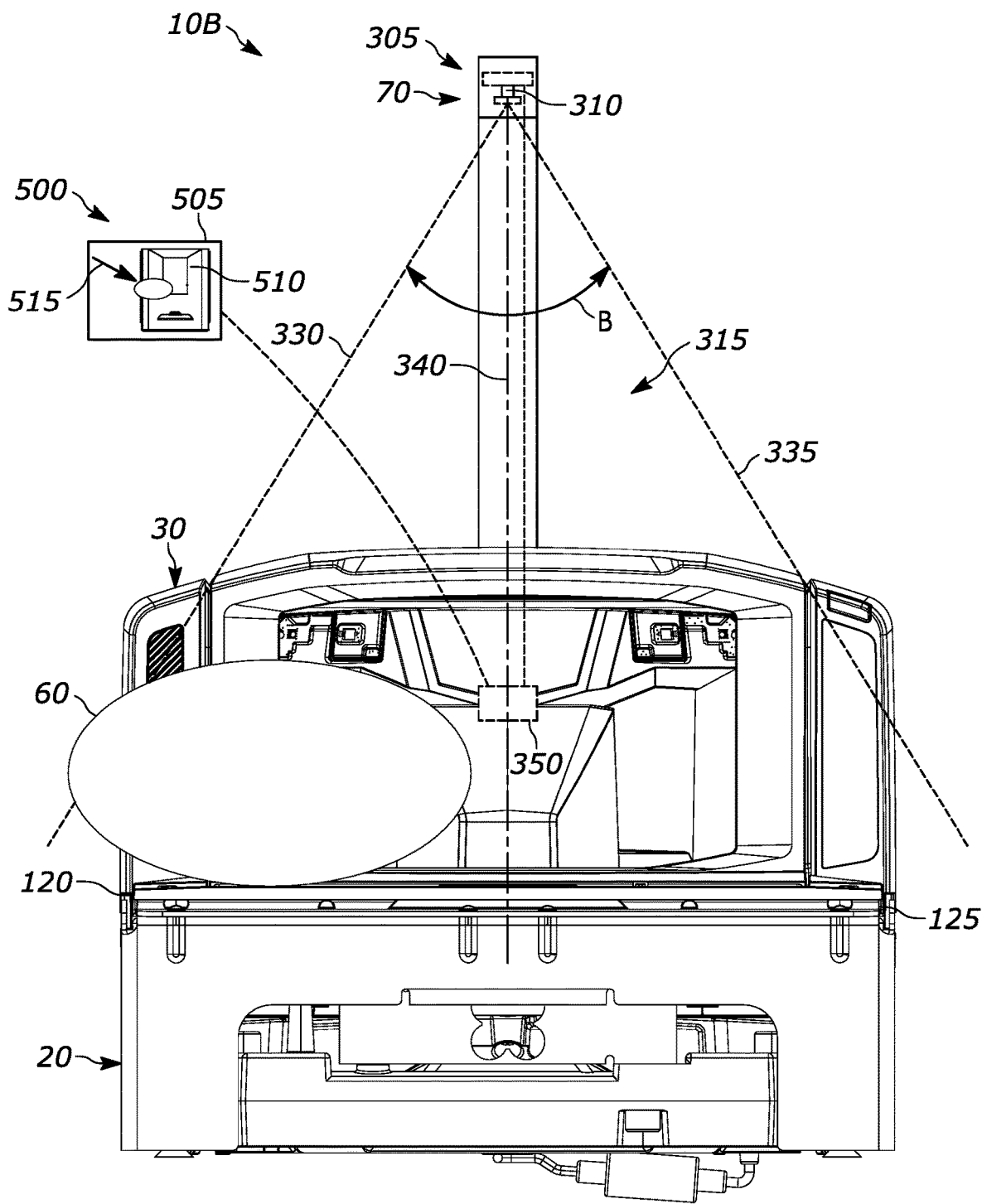
FIG. 11 illustrates a front view of the checkout workstation of FIG. 10 with an object extending across a first lateral edge of the weigh platter.

Referring to FIGS. 10-11, a third example checkout workstation 10B is illustrated that is the same as checkout workstation 10A with off-platter detection assembly 300 described above and shown in FIGS. 8-9, but includes a third example off-platter indication system 500, rather than off-platter indication system 450. In checkout workstation 10B, off-platter indication system 500 is in communication with controller 350 and has a visual display 505, which could be a display of checkout workstation 10B, a display or monitor that is separate from and in communication with checkout workstation 10B, or a display of a point-of-sale system operatively coupled to checkout workstation 10B. In this example, if controller 350 determines that object 60 does extend over first lateral edge 120 and/or second lateral edge 125, rather than controlling the illumination and de-illumination of light sources 455, controller 350 can be configured to display a platter representation 510 on visual display 505 with an indication 515 of the location where object 60 extends over first and/or second lateral edges 120, 125. Platter representation 510 can be a live video feed that controller 350 receives from overhead imaging assembly 305, a photographic representation of weigh platter 105, or a drawing or rendering of weigh platter 105. As shown, indication 515 is an arrow that points to the location that object 60 extends across first and/or second lateral edges 120, 125, but indication 515 could be any indicator that would communicate to the user the location, such as highlighting a portion of weigh platter 105 where the off-platter event is occurring. In addition to providing the an alert to a user on visual display 505, controller 350 can also be configured to allow the measure weight of object 60 to be recorded if controller 350 determines that object 60 does not extend over either first or second lateral edges 120, 125 and prevent the measured weight of object from being recorded if controller 350 determines that object 60 does extend over either first or second lateral edges 120, 125.

Furthermore, since field-of-view 315 of overhead imaging assembly 305 encompasses the entire weigh platter 105, including distal edge 130, in addition to determining if object 60 extends over first or second lateral edges 120, 125, controller 350 can be configured to determine if object 60 extends over distal edge 130 based on the image and, if so, determine a location where object 60 extends over distal edge 130. If controller 350 determines that object 60 extends over distal edge 130, off-platter indication system 500 can display platter representation 510 on visual display 505 with indication 515 of the location where object 60 extends over distal edge 130 displayed in platter representation 510. In addition to providing the an alert to a user on visual display 505, controller 350 can also be configured to allow the measure weight of object 60 to be recorded if controller 350 determines that object 60 does not extend over distal edge 130 and prevent the measured weight of object from being recorded if controller 350 determines that object 60 does extend over distal edge 130.

Figure 12:
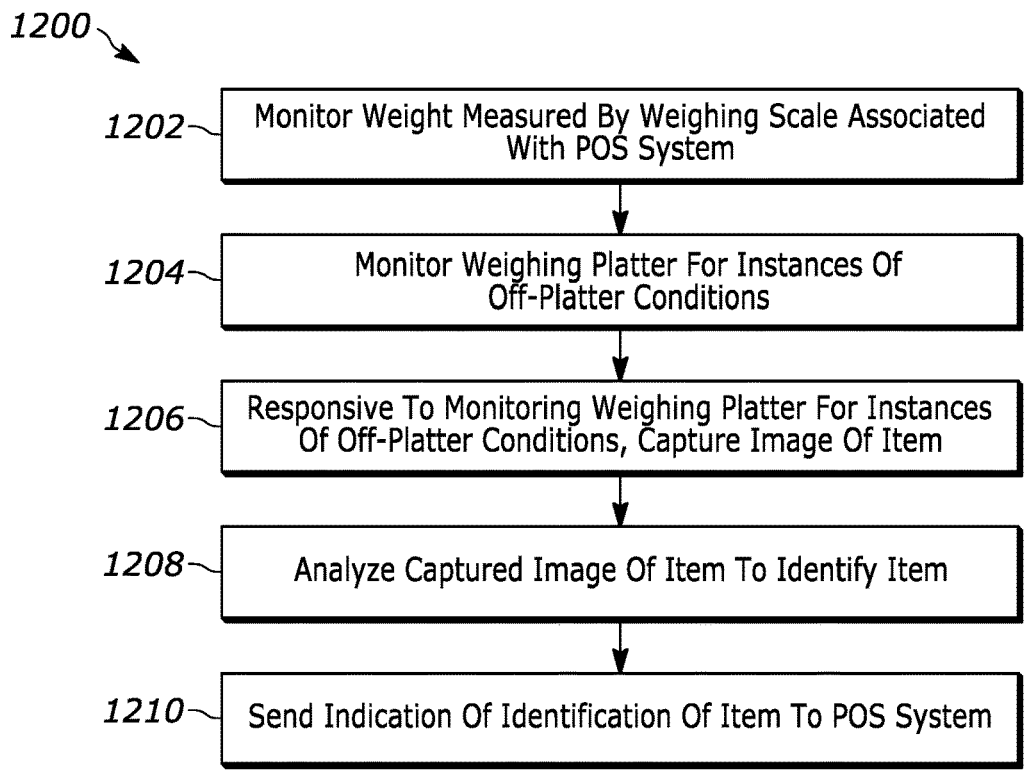
FIG. 12 illustrates a block diagram of an example process as may be implemented by the system of FIG. 1, for implementing example methods and/or operations described herein, including methods for improving the effectiveness of an off-platter detection system based on input from an object recognition system.

FIG. 12 illustrates a block diagram of an example process 1200 as may be implemented by the system of FIG. 1, for improving the effectiveness of an off-platter detection system based on input from an object recognition system. One or more steps of the method 1200 may be implemented as a set of instructions stored on a computer-readable memory (e.g., memory 1116 and/or memory 1122) and executable on one or more processors (e.g., processors 1114 and/or processors 1120).

At block 1202, the weight measured by a weighing scale or weighing platter associated with a POS system may be monitored. The measured weight may fluctuate as an item to be purchased is placed onto the weighing platter, i.e., depending on whether the item to be purchased is fully resting on the weighing platter or not.

At block 1204, the weighing platter may be monitored for any instances of off-platter conditions, in which at least a portion of an item to be purchased using the POS system is not resting on the weighing platter. For instance, examples of off-platter conditions may include a conditions in which an item to be purchased is only partially resting on the weighing platter, conditions in which items to be purchased are in motion and not settled on the weighing platter, conditions in a bag of items to be purchased (such as apples or oranges) are spilling over the sides of the weighing platter, etc. In some examples, if an off-platter condition is detected, a message may be provided to a user of the checkout station indicating that the user must resolve the off-platter condition in order to proceed. For instance, the message may be provided via, e.g., a user interface, a voice instruction over a speaker, an error beep, an LED flash, etc.

Additionally, in some examples, if an off-platter condition is detected, an image or video of the weighing platter, and/or an image of the user of the checkout station, may be captured. This image or video may be analyzed to determine a location or direction associated with the portion of the item to be purchased using the POS system that is not resting on the weighing platter, and the message provided to the user regarding resolving the off-platter condition may include an indication of the determined location or direction, i.e., so that the user knows how best to resolve the off-platter condition. For instance, the message provided to the user may indicate that the item is falling off of the weighing platter on the left side, so that the user can check the left side of the weighing platter and move the item onto the weighing platter.

In some examples, additional images or video of the weighing platter may be captured and analyzed to determine whether the user has attempted to resolve the instance of the off-platter condition, e.g., whether the item is moved or whether the user's hand moved in the vicinity of the off-platter location.

At block 1206, an image of the item to be purchased may be captured responsive to monitoring the weighing platter for instances of off-platter conditions. For instance, in some examples, capturing the image may be based on determining that there are no instances of off-platter conditions. Additionally, in some examples, capturing the image may be based on determining that any detected instances of off-platter conditions have been resolved (e.g., corrected by the user, so that the item is now fully resting on the weighing platter). For instance, if there are remaining instances of off-platter conditions, the image of the item may not be captured until those instances of off-platter conditions are resolved.

At block 1208, the captured image of the item to be purchased may be analyzed to identify the item. In some examples, the item may be completely identified based on analyzing the captured image. For instance, the captured image may be analyzed to determine that the item is an apple. In other examples, the item may be partially identified, and/or the possible identifications for the item may be narrowed to two or more possible identifications. For instance, the captured image may be analyzed to determine that the item is likely either a lemon or a lime.

At block 1210, an indication of the identification (or multiple possible identifications) of the item may be sent to the POS system. In examples in which there are two or more possible identifications for the item, the POS system may display these possible identifications via a user interface, where a user may select which of the possible identified items is the item is to be purchased. For instance, the POS system may calculate a price for the item based on receiving the identification of the item (i.e., either directly based on the analysis of the image, or based on a selection by the user), using the most recent weight measured by the weighing platter at the time when the indication of the identification of the item is received. Accordingly, because the image of the item to be purchased is captured in response to determining that there are no instances of off-platter conditions remaining, the most recent weight measured when the POS system receives the indication of the identification of the item (determined based on the captured image) is likely a stable weight for the item, i.e., because any off-platter conditions have already been resolved.

Figure 13:
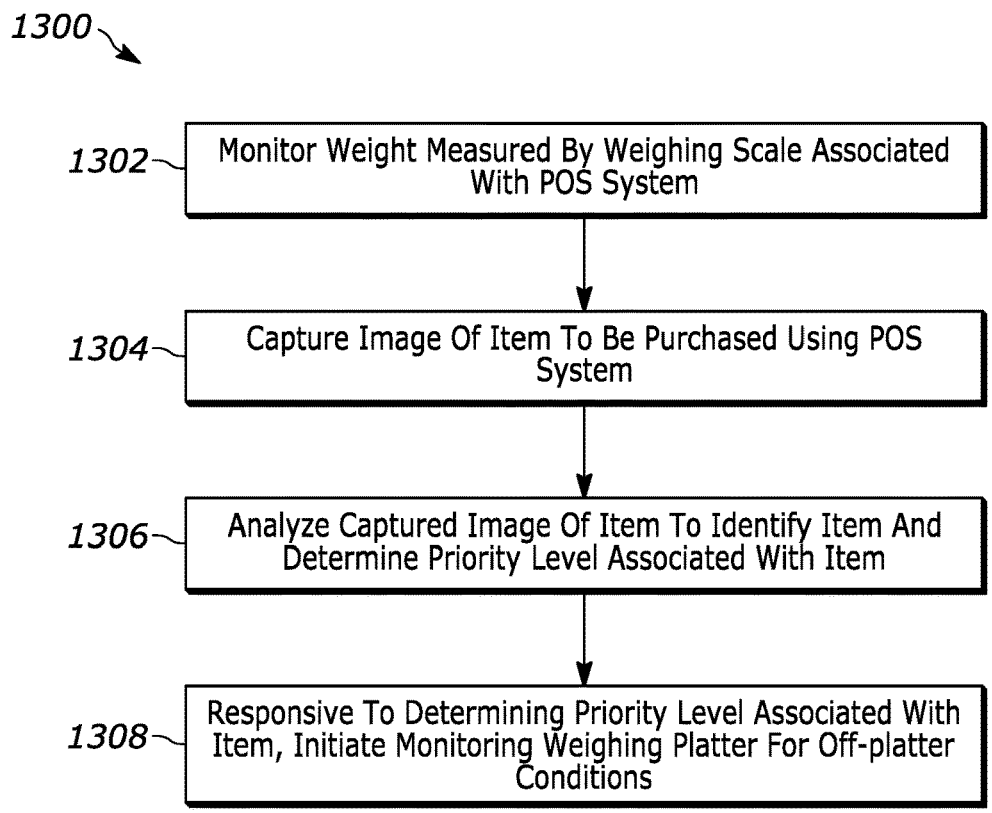
FIG. 13 illustrates a block diagram of an example process as may be implemented by the system of FIG. 1, for implementing example methods and/or operations described herein, including methods for improving the effectiveness of an off-platter detection system based on input from an object recognition system indicating a priority level associated with an item to be purchased.

FIG. 13 illustrates a block diagram of an example process 1300 as may be implemented by the system of FIG. 1, for improving the effectiveness of an off-platter detection system based on input from an object recognition system indicating a priority level associated with an item to be purchased. One or more steps of the method 1300 may be implemented as a set of instructions stored on a computer-readable memory (e.g., memory 1116 and/or memory 1122) and executable on one or more processors (e.g., processors 1114 and/or processors 1120).

At block 1302, the weight measured by a weighing scale or weighing platter associated with a POS system may be monitored. The measured weight may fluctuate as an item to be purchased is placed onto the weighing platter, i.e., depending on whether the item to be purchased is fully resting on the weighing platter or not.

At block 1304, an image of the item to be purchased may be captured.

At block 1306, the captured image of the item may be analyzed to identify the item to be purchased and determine a priority level associated with the item. In some examples, the item may be completely identified based on analyzing the captured image. For instance, the captured image may be analyzed to determine that the item is an apple. In other examples, the item may be partially identified, and/or the possible identifications for the item may be narrowed to two or more possible identifications. For instance, the captured image may be analyzed to determine that the item is likely either a lemon or a lime.

The priority level associated with the item to be purchased may be based on various factors, including, e.g., a total price associated with the item, a price per unit weight associated with the item, whether the item is a controlled item, such as alcohol, cigarettes, or certain medications, and/or a high theft potential associated with the item. For example, a high theft potential associated with the item may be determined based on, e.g., frequent observations of ticket switching associated with the item, and/or frequent observations of scan avoidance associated with the item. For instance, a higher priced item, or an item with a higher price per weight, or a controlled item, or an item with a high theft potential, may be assigned a higher priority level than a lower priced item, an item with a lower price per unit weight, a non-controlled item, and/or an item with a low theft potential. In instances in which there are two or more possible identifications for the item, the highest priority level of the priority levels associated with each respective possible identification may be considered the priority level associated with the item to be purchased. For instance, if one possible identification for the item has a high priority level, but another possible identification for the item has a low priority level, the item may be assigned a high priority level.

At block 1308, determining the priority level associated with the item to be purchased may trigger or initiate monitoring the weighing platter for any instances of off-platter conditions, in which at least a portion of the item is not resting on the weighing platter. For example, when the priority level associated with the item to be purchased is above a threshold priority level, the weighing platter may be monitored for instances of off-platter conditions, but when the priority level associated with the item to be purchased is below the threshold priority level, this monitoring of the weighing platter may not be activated or triggered. That is, for lower-priority items, off-platter conditions may not affect the ultimate price of the item significantly, and thus, in some cases, it may be more efficient to proceed without monitoring for off-platter conditions for lower-priority items.

In some examples, if an off-platter condition is detected for a higher-priority item, a message may be provided to a user of the checkout station indicating that the user must resolve the off-platter condition in order to proceed. For instance, the message may be provided via, e.g., a user interface, a voice instruction over a speaker, an error beep, an LED flash, etc.

Additionally, some examples, if an off-platter condition is detected for a higher-priority item, an image or video of the weighing platter, and/or an image of the user of the checkout station, may be captured. This image or video may be analyzed to determine a location or direction associated with the portion of the item to be purchased using the POS system that is not resting on the weighing platter, and the message provided to the user regarding resolving the off-platter condition may include an indication of the determined location or direction, i.e., so that the user knows how best to resolve the off-platter condition. For instance, the message provided to the user may indicate that the item is falling off of the weighing platter on the left side, so that the user can check the left side of the weighing platter and move the item onto the weighing platter.

In some examples, additional images or video of the weighing platter may be captured and analyzed to determine whether the user has attempted to resolve the instance of the off-platter condition, e.g., whether the item is moved or whether the user's hand moved in the vicinity of the off-platter location.

If the priority level associated with the item triggers or initiates monitoring the weighing platter for instances of off-platter conditions, an indication of the identification (or multiple possible identifications) of the item may be sent to the POS system based on there not being any instances of off-platter conditions, or only once any instances of off-platter conditions are resolved. In some examples, if the priority level associated with the item is below a certain threshold level, and the weighing platter is not monitored for instances of off-platter conditions, this step may be skipped, and an indication of the identification (or multiple possible identifications) of the item determined at block 1306 may be to the POS system without consideration of off-platter conditions or resolutions thereof.

In examples in which there are two or more possible identifications for the item, the POS system may display these possible identifications via a user interface, where a user may select which of the possible identified items is the item is to be purchased. The POS system may then calculate a price for the item based on receiving the identification of the item (i.e., either directly based on the analysis of the image, or based on a selection by the user), using the most recent weight measured by the weighing platter at the time when the indication of the identification of the item is received.

Accordingly, because the indication of the identification of the item to be purchased is sent to the POS system in response to determining that there are no instances of off-platter conditions remaining (or in response to determining that the priority level of the item does not warrant monitoring for off-platter conditions), the most recent weight measured when the POS system receives the indication of the identification of the item is either a stable weight for the item (i.e., because any off-platter conditions have already been resolved) or does not ultimately affect the price of the item significantly (i.e., because the item is lower-priority).

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An object recognition and weighing apparatus for use with a point of sale (POS) terminal that is operable to execute a transaction associated with a purchase of an item, the object recognition and weighing apparatus comprising:
a weigh platter having a first surface extending in a first transverse plane;
a scale configured to measure a weight of the item when placed on the surface;
an off-platter detection assembly configured to detect an off-platter condition and a no-off-platter condition;
an object recognition assembly configured to capture image data associated with the item when placed on the surface and, based on the image data that includes non-barcode data, identify the item as an identified item set, the identified item set including one or more items selected from a preexisting item database where the one or more items are selected based satisfying a predetermined similarity threshold relative to the item;
a communication interface configured to communicate with the POS terminal;
a processor in communication with the scale, the off-platter detection assembly, and the communication interface; and
a non-transitory machine-readable storage medium storing instructions that, when executed by the processor, cause the object recognition and weighing apparatus to:
responsive to detecting the off-platter condition, prevent a transmission of the identified item set to the POS terminal; and
responsive to detecting the no-off-platter condition, enable the transmission of the identified item set to the POS terminal,
wherein the off-platter detection assembly is configured to detect the off-platter condition based on at least one of (i) a portion of the item resting on a second surface off the weigh platter resulting or (ii) at least some portion of the item extending beyond a perimeter of the weigh platter, and
wherein the off-platter detection assembly is further configured to detect the no-off-platter condition based on at least one of (i) no portion of the item resting on the second surface off the weigh platter or (ii) no portion of the item extending beyond the perimeter of the weigh platter.

2. The object recognition and weighing apparatus of claim 1, wherein the POS terminal is configured to calculate a price for each item based on the identified item set and based on the most recent weight measured by the scale at the time of transmission of the identified item set.

3. The object recognition and weighing apparatus of claim 1, wherein the instructions, when executed by the processor, further cause the object recognition and weighing apparatus to
display the two or more items of the identified item set via a user interface; and
receive an indication of a selection of one of the two or more items by a user; and
wherein enabling the transmission of the identified item set to the POS terminal includes enabling the transmission of the selected item of the identified item set to the POS terminal.

4. The object recognition and weighing apparatus of claim 1, further comprising a camera configured to capture an image or video of a user, responsive to the off-platter detection assembly detecting an off-platter condition.

5. The object recognition and weighing apparatus of claim 1, wherein the instructions, when executed by the processor, further cause the object recognition and weighing apparatus to provide a message to a user indicating that the user must resolve the off-platter condition in order to proceed, via one or more of a user interface, a voice instruction over a speaker, an error beep, or an LED flash, responsive to the off-platter detection assembly detecting an off-platter condition.

6. The object recognition and weighing apparatus of claim 5, wherein the instructions, when executed by the processor, further cause the object recognition and weighing apparatus to analyze the image data associated with the item to determine a location or direction associated with the off-platter condition; and wherein the message to the user includes an indication of the determined location or direction.

7. The object recognition and weighing apparatus of claim 6, wherein the instructions, when executed by the processor, further cause the object recognition and weighing apparatus to analyze the image data associated with the item after providing the message to the user, to determine whether the user has attempted to resolve the off-platter condition.

8. The object recognition and weighing apparatus of claim 7, wherein analyzing the image data to determine whether the user has attempted to resolve the off-platter condition includes determining one or more of: whether the item is moved or whether a hand of the user moved in the vicinity of the determined location or direction.

9. The object recognition and weighing apparatus of claim 1, wherein detecting a no-off-platter condition is a default mode of operation of the off-platter detection assembly.

10. An object recognition and weighing apparatus for use with a point of sale (POS) terminal that is operable to execute a transaction associated with a purchase of an item, the object recognition and weighing apparatus comprising:
a weigh platter having a first surface extending in a first transverse plane;
a scale configured to measure a weight of the item when placed on the surface;
an object classification identification system configured to determine if the item is a high-priority item or a non-high-priority item;
an off-platter detection assembly configured to detect an off-platter condition and a no-off-platter condition;
an object recognition assembly configured to capture image data associated with the item when placed on the surface and, based on the image data that includes non-barcode data, identify the item as an identified item set, the identified item set including one or more items selected from a preexisting item database where the one or more items are selected based satisfying a predetermined similarity threshold relative to the item;
a communication interface configured to communicate with the POS terminal;
a processor in communication with the scale, the off-platter detection assembly, and the communication interface; and
a non-transitory machine-readable storage medium storing instructions that, when executed by the processor, cause the object recognition and weighing apparatus to:
responsive to detecting the item being the high-priority item, (i) prevent a transmission of the identified item set to the POS terminal when the off-platter condition is detected and (ii) enable the transmission of the identified item set to the POS terminal when the no-off-platter condition is detected;
responsive to detecting the item being the non-high-priority item, enable the transmission of the identified item set to the POS without regard for whether the off-platter condition or the no-off-platter condition is present,
wherein the off-platter detection assembly is configured to detect the off-platter condition based on at least one of (i) a portion of the item resting on a second surface off the weigh platter resulting or (ii) at least some portion of the item extending beyond a perimeter of the weigh platter, and
wherein the off-platter detection assembly is further configured to detect the no-off-platter condition based on at least one of (i) no portion of the item resting on the second surface off the weigh platter or (ii) no portion of the item extending beyond the perimeter of the weigh platter.

11. The object recognition and weighing apparatus of claim 10, wherein the POS terminal is configured to calculate a price for each item based on the identified item set and based on the most recent weight measured by the scale at the time of transmission of the identified item set.

12. The object recognition and weighing apparatus of claim 10, wherein the item being the high-priority item is based on one or more of: a total price associated with the item, a price per unit weight associated with the item, a high theft potential associated with the item, or whether the item is a controlled item.

13. The object recognition and weighing apparatus of claim 12, wherein a high theft potential associated with the item is based on one or more of: frequent observations of ticket switching associated with the item, or frequent observations of scan avoidance associated with the item.

14. The object recognition and weighing apparatus of claim 10, wherein the item being the high-priority item is based on the higher priority level of the priority levels associated with each of the items of the identified item set.

15. The object recognition and weighing apparatus of claim 10, wherein the instructions, when executed by the processor, further cause the object recognition and weighing apparatus to
display the two or more items of the identified item set via a user interface; and
receive an indication of a selection of one of the two or more items by a user; and
wherein enabling the transmission of the identified item set to the POS terminal includes enabling the transmission of the selected item of the identified item set to the POS terminal.

16. The object recognition and weighing apparatus of claim 10, further comprising a camera configured to capture an image or video of a user, responsive to the off-platter detection assembly detecting an off-platter condition.

17. The object recognition and weighing apparatus of claim 10, wherein the instructions, when executed by the processor, further cause the object recognition and weighing apparatus to provide a message to a user indicating that the user must resolve the off-platter condition in order to proceed, via one or more of a user interface, a voice instruction over a speaker, an error beep, or an LED flash, responsive to the off-platter detection assembly detecting an off-platter condition.

18. The object recognition and weighing apparatus of claim 17, wherein the instructions, when executed by the processor, further cause the object recognition and weighing apparatus to analyze the image data associated with the item to determine a location or direction associated with the off-platter condition; and wherein the message to the user includes an indication of the determined location or direction.

19. The object recognition and weighing apparatus of claim 18, wherein the instructions, when executed by the processor, further cause the object recognition and weighing apparatus to analyze the image data associated with the item after providing the message to the user, to determine whether the user has attempted to resolve the off-platter condition.

20. The object recognition and weighing apparatus of claim 19, wherein analyzing the image data to determine whether the user has attempted to resolve the off-platter condition includes determining one or more of: whether the item is moved or whether a hand of the user moved in the vicinity of the determined location or direction.

21. The object recognition and weighing apparatus of claim 10, wherein detecting a no-off-platter condition is a default mode of operation of the off-platter detection assembly.

* * * * *